(12) United States Patent
Garcia et al.

(10) Patent No.: US 9,052,003 B2
(45) Date of Patent: *Jun. 9, 2015

(54) MULTI-SPEED TRANSMISSION GEAR AND CLUTCH ARRANGEMENT

(71) Applicant: GM Global Technology Operations LLC, Detroit, MI (US)

(72) Inventors: Pete R. Garcia, Troy, MI (US); John A. Diemer, Farmington Hills, MI (US); Tejinder Singh, Commerce Township, MI (US); Douglas John Dwenger, Plymouth, MI (US)

(73) Assignee: GM Global Technoloy Operations, LLC, Detroit, MI (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/756,576

(22) Filed: Feb. 1, 2013

(65) Prior Publication Data

US 2013/0260942 A1   Oct. 3, 2013

Related U.S. Application Data

(60) Provisional application No. 61/619,849, filed on Apr. 3, 2012.

(51) Int. Cl.
*F16H 3/62* (2006.01)
*F16H 37/04* (2006.01)
*F16H 3/66* (2006.01)

(52) U.S. Cl.
CPC ............. *F16H 37/046* (2013.01); *F16H 3/62* (2013.01); *F16H 3/66* (2013.01); *F16H 2200/0069* (2013.01); *F16H 2200/2012* (2013.01); *F16H 2200/2048* (2013.01)

(58) Field of Classification Search
CPC ................ F16H 2200/2048; F16H 2200/0069; F16H 2200/006; F16H 2200/2012; F16H 3/66
USPC .......................................................... 475/276
See application file for complete search history.

(56) References Cited

U.S. PATENT DOCUMENTS

| 6,991,578 | B2 |  | 1/2006 | Ziemer |  |
|---|---|---|---|---|---|
| 7,011,597 | B2 |  | 3/2006 | Haka |  |
| 7,018,319 | B2 |  | 3/2006 | Ziemer |  |
| 7,914,414 | B2 | * | 3/2011 | Phillips et al. | 475/276 |
| 8,152,683 | B2 | * | 4/2012 | Phillips | 475/275 |
| 8,303,454 | B1 | * | 11/2012 | Shim et al. | 475/280 |
| 8,376,893 | B2 | * | 2/2013 | Wittkopp et al. | 475/275 |
| 8,403,802 | B2 | * | 3/2013 | Wittkopp et al. | 475/276 |
| 8,409,045 | B1 | * | 4/2013 | Mellet et al. | 475/280 |
| 8,435,154 | B1 | * | 5/2013 | Mellet et al. | 475/278 |
| 8,506,443 | B2 | * | 8/2013 | Seo et al. | 475/280 |

(Continued)

OTHER PUBLICATIONS

Pending U.S. Appl. No. 13/673,539, filed Nov. 9, 2012, by Garcia et al. All pages.

(Continued)

*Primary Examiner* — Dirk Wright (57) ABSTRACT

A transmission includes an input member, an output member, at least four planetary gear sets, a plurality of coupling members and a plurality of torque transmitting devices. Each of the planetary gear sets includes first, second and third members. The torque transmitting devices include clutches and brakes that are actuated in various combinations to establish a plurality of forward gear ratios and a reverse gear ratio.

20 Claims, 6 Drawing Sheets (56) References Cited

U.S. PATENT DOCUMENTS

| | | | |
|---|---|---|---|
| 8,512,197 B2* | 8/2013 | Mellet et al. | 475/276 |
| 8,517,885 B2* | 8/2013 | Shim et al. | 475/276 |
| 8,517,886 B2* | 8/2013 | Seo et al. | 475/288 |
| 8,562,486 B1* | 10/2013 | Eber | 477/176 |
| 8,591,376 B1* | 11/2013 | Shim et al. | 475/276 |
| 8,632,435 B2* | 1/2014 | Garcia et al. | 475/278 |
| 8,715,129 B1* | 5/2014 | Coffey | 475/276 |
| 8,734,286 B2* | 5/2014 | Coffey et al. | 475/276 |
| 2012/0172173 A1* | 7/2012 | Wittkopp et al. | 475/277 |
| 2012/0270694 A1* | 10/2012 | Seo et al. | 475/276 |
| 2013/0190127 A1* | 7/2013 | Singh | 475/276 |
| 2013/0231215 A1 | 9/2013 | Coffey et al. | |

OTHER PUBLICATIONS

Pending U.S. Appl. No. 13/679,352, filed Nov. 16, 2012, by Singh. All pages.

* cited by examiner

Fig-1

| Gear State | Gear Ratio | Ratio Step | Torque Transmitting Elements ||||||| 
|---|---|---|---|---|---|---|---|---|---|
| | | | 38 | 34 | 36 | 26 | 28 | 32 | 30 |
| Rev | -2.940 | | | | x | x | | | |
| N | | -0.64 | | | | | | | |
| 1st | 4.585 | | x | | x | | | | |
| 2nd | 2.966 | 1.55 | | x | | | | | |
| 3rd | 2.624 | 1.13 | x | | | | | x | |
| 4th | 2.415 | 1.09 | x | | | | | | x |
| 5th | 1.913 | 1.26 | x | | | x | | | |
| 6th | 1.446 | 1.32 | x | | | | x | | |
| 7th | 1.000 | 1.45 | | | | x | x | | |
| 8th | 0.904 | 1.11 | | | | | x | x | |
| 9th | 0.746 | 1.21 | | x | | | x | | |
| 10th | 0.621 | 1.20 | | | | x | | x | |

MULTI-SPEED TRANSMISSION GEAR AND CLUTCH ARRANGEMENT

CROSS-REFERENCE TO RELATED APPLICATIONS

This application claims the benefit of U.S. Provisional Application No. 61/619,849 filed Apr. 3, 2012. The disclosure of the above application is incorporated herein by reference.

FIELD

The present invention relates to a multi-speed transmission. More specifically, the present invention relates to a gear and clutch arrangement for a multi-speed transmission.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A powertrain includes an input member, an output member, at least four planetary gear sets, a plurality of coupling members and a plurality of torque transmitting devices. Each of the planetary gear sets includes first, second and third members. The torque transmitting devices include clutches and brakes that are actuated in various combinations to establish a plurality of forward gear ratios and a reverse gear ratio.

In one example of the present invention, the powertrain includes an input member, an output member, a transfer mechanism coupled to the output member, first, second, third and fourth planetary gear sets each having first, second and third members, a first interconnecting member continuously interconnecting the second member of the first planetary gear set with the third member of the third planetary gear set, a second interconnecting member continuously interconnecting the third member of the first planetary gear set with the second member of the second planetary gear set, a third interconnecting member continuously interconnecting the third member of the second planetary gear set with the second member of the third planetary gear set, a fourth interconnecting member continuously interconnecting the second member of the third planetary gear set with the third member of the fourth planetary gear set, and a fifth interconnecting member continuously interconnecting the first member of the third planetary gear set with the second member of the fourth planetary gear set. Seven torque transmitting mechanisms are each selectively engageable to interconnect at least one of the first, second, and third members with at least one other of the first, second, third members and a stationary member. The seven torque transmitting mechanisms are selectively engageable in combinations of at least two to establish at least ten forward speed ratios and at least one reverse speed ratio between the input member and the output member.

In another example of the present invention, a first of the seven torque transmitting mechanisms is selectively engageable to interconnect the first member of the third planetary gear set and the second member of the fourth planetary gear set with the input member and the first member of the second planetary gear set.

In yet another example of the present invention, a second of the seven torque transmitting mechanisms is selectively engageable to interconnect the third member of the second planetary gear set, the second member of the third planetary gear set and the third member of the fourth planetary gear set with the input member and the first member of the second planetary gear set.

In another example of the present invention, a third of the seven torque transmitting mechanisms is selectively engageable to interconnect the first member of the third planetary gear set and the second member of the fourth planetary gear set with the third member of the fourth planetary gear set, the second member of the third planetary gear set, and the third member of the second planetary gear set.

In another example of the present invention, the third of the seven torque transmitting mechanisms is selectively engageable to interconnect the first member of the fourth planetary gear set with the third member of the fourth planetary gear set, the second member of the third planetary gear set, and the third member of the second planetary gear set.

In another example of the present invention, the third of the seven torque transmitting mechanisms is selectively engageable to interconnect the first member of the of the fourth planetary gear set with the second member of the fourth planetary gear set and the first member of the third planetary gear set.

In another example of the present invention, a fourth of the seven torque transmitting mechanisms is selectively engageable to interconnect the first member of the fourth planetary gear set with the stationary member.

In another example of the present invention, a fifth of the seven torque transmitting mechanisms is selectively engageable to interconnect the second member of the fourth planetary gear set and the first member of the third planetary gear set with the stationary member.

In another example of the present invention, a sixth of the seven torque transmitting mechanisms is selectively engageable to interconnect the third member of the fourth planetary gear set, second member of the third planetary gear set and the third member of the second planetary gear set with the stationary member.

In another example of the present invention, a seventh of the seven torque transmitting mechanisms is selectively engageable to interconnect the first member of the first planetary gear set with the stationary member.

In another example of the present invention, the input member is continuously connected for common rotation with the first member of the second planetary gear set.

In another example of the present invention, the output member is continuously connected for common rotation with the second member of the first planetary gear set and the third member of the third planetary gear set.

In another example of the present invention, the first member of the first planetary gear set, the first member of the second planetary gear set, the first member of the third planetary gear set and the first member of the fourth planetary gear set are each sun gears, the second member of the first planetary gear set, the second member of the second planetary gear set, the second member of the third planetary gear set, and the second member of the fourth planetary gear set are each carrier members and the third member of the first planetary gear set, the third member of the second planetary gear set, the third member of the third planetary gear set and the third member of the fourth planetary gear set are each ring gears.

In another example of the present invention, an output torque is transmitted to the transfer mechanism through the output member, wherein the transfer mechanism includes a differential assembly that provides front-wheel drive and all-wheel drive modes to the motor vehicle.

In another example of the present invention, the transfer mechanism comprises a transfer gear train having a first transfer gear intermeshed with a second transfer gear, wherein the first transfer gear is rotatably fixed to the output member and the second transfer gear is rotatably fixed to an intermediate shaft, a differential gear set for driving a pair of road wheels, a pinion gear rotatably fixed to the intermediate shaft, and an input differential gear in mesh with the pinion gear and configured to rotatably drive the differential gear set.

In another example of the present invention, the transfer mechanism comprises a power transfer assembly having a first transfer gear and a second transfer gear, wherein the first transfer gear is rotatably fixed to the output member and the second transfer gear is rotatably fixed to a drive shaft, a power transfer member rotatably coupling the first and second transfer gears for transferring rotational energy from the first transfer gear to the second transfer gear, a final drive planetary gear set coupled to the drive shaft for receiving a driving torque from the second transfer gear, and a differential gear set coupled to the final drive planetary gear set and to a pair of road wheels for receiving a final drive rotational torque and transferring the final drive torque to the pair of road wheels.

In another example of the present invention, the power transfer member is a chain or belt.

In another example of the present invention, the final drive planetary gear set includes a sun gear, a ring gear, and a carrier member, and wherein the sun gear is connected to the drive shaft, the ring gear is connected to the stationary member, and the carrier member is coupled to the differential gear set.

In another example of the present invention, a torque converter is coupled to the input member, the torque converter providing an input torque to the input member.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. A second component or element of a first planetary gear set is permanently coupled to a third component or element of the third planetary gear set. A third component or element of the first planetary gear set is permanently coupled a second component or element of the second planetary gear set. A third component or element of the second planetary gear set is permanently coupled to a second component or element of the third planetary gear set and a third component or element of the fourth planetary gear set. A first component or element of the third planetary gear set is permanently coupled to a second component or element of the fourth planetary gear set.

Figure 1:
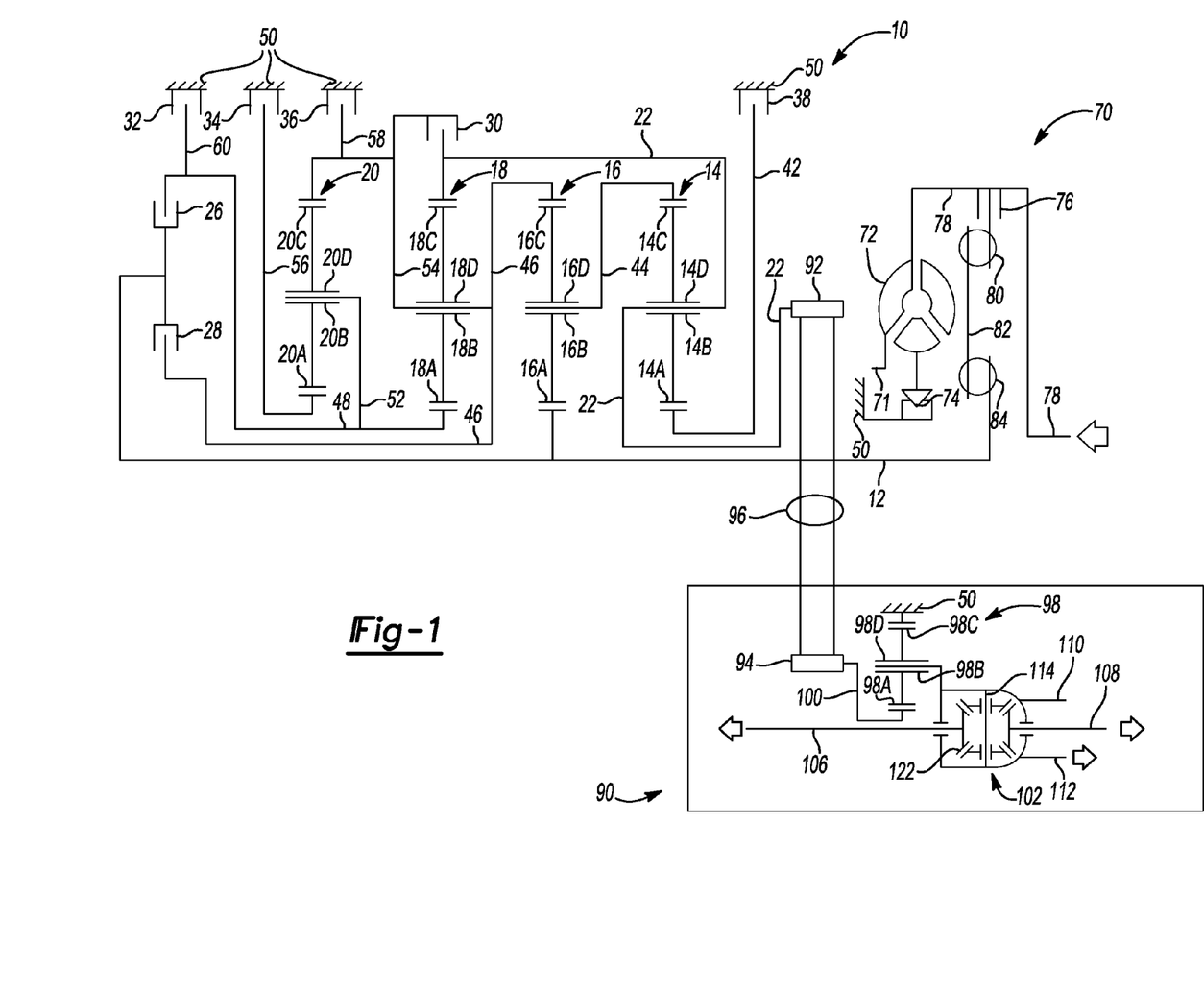
FIG. 1 is a diagrammatic illustration of a transmission with a gear and clutch arrangement in accordance with the principles of the present invention.

Referring now to the drawings, a transmission with a gear and clutch arrangement embodying the principles of the present invention is shown in FIG. 1 and designated at 10. The transmission 10 includes an input shaft or member 12, a first planetary gear set 14, a second planetary gear set 16, a third planetary gear set 18 and a fourth planetary gear set 20 and an output shaft or member 22. Each of the planetary gear sets 14, 16, 18, and 20 includes three members or nodes corresponding to one of a sun gear member, a planet carrier member, and a ring gear member. For example, the input member 12 is continuously coupled to the first node 16A of the second planetary gear set 16. The output member 22 is coupled to the second node 14B of the first planetary gear set 14 and the third node 18C of the third planetary gear set 18. The second node 14B of the first planetary gear set 14 is coupled to the third node 18C of the third planetary gear set 18. The third node 14C of the first planetary gear set 14 is coupled to the second node 16B of the second planetary gear set 16. The third node 16C of the second planetary gear set 16 is coupled to the second node 18B of the third planetary gear set 18. The first node 18A of the third planetary gear set 18 is coupled to second node 20B of the fourth planetary gear set 20. The second node 18B of the third planetary gear set 18 is coupled to the third node 20C of the fourth planetary gear set 20.

A first clutch 26 selectively connects the input member or shaft 12 and the first node 16A of the second planetary gear set 16 with the first node 18A of the third planetary gear set 18 and the second node 20B of the fourth planetary gear set 20. A second clutch 28 selectively connects the input member or shaft 12 and the first node 16A of the second planetary gear set 16 with the third node 16C of the second planetary gear set 16, the second node 18B of the third planetary gear set 18 and the third node 20C of the fourth planetary gear set 20. A third clutch 30 selectively connects the third node 20C of the fourth planetary gear set 20 with the third node 18C of the third planetary gear set 18, the second node 14B of the first planetary gear set 14 and the output member 22. A first brake 32 selectively connects the first node 20A of the fourth planetary gear set 20 with a stationary member or transmission housing 50. A second brake 34 selectively connects the first node 18A of the third planetary gear set 18 and the second node 20B of the fourth planetary gear set 20 with the stationary member or transmission housing 50. A third brake 36 selectively connects the third node 16C of the second planetary gear set 16, the second node 18B of the third planetary gear set 18 and the third node 20C of the fourth planetary gear set 20 with the stationary member or transmission housing 50.

The planetary gear set 14 includes a sun gear member 14A, a ring gear member 14C and a planet gear carrier member 14B that rotatably supports a set of planet gears 14D. The sun gear member 14A is connected for common rotation with a first shaft or interconnecting member 42. The ring gear member 14C is connected for common rotation with a second shaft or interconnecting member 44. The planet carrier member 14B is connected for common rotation with the output shaft or member 22. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D. The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48, a fifth shaft or interconnecting member 52, and a sixth shaft or interconnecting member 60. The ring gear member 18C is connected for common rotation with the output shaft or member 22. The planet carrier member 18B is connected for common rotation with the third shaft or interconnecting member 46 and with a seventh shaft or interconnecting member 54. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports a set of planet gears 20D. The sun gear member 20A is connected for common rotation with an eighth shaft or interconnecting member 56. The ring gear member 20C is connected for common rotation with a ninth shaft or interconnecting member 58 and with the sixth shaft or interconnecting member 54. The planet carrier member 20B is connected for common rotation with the fifth shaft or interconnecting member 52, the fourth shaft or interconnecting member 48, and the sixth shaft or interconnecting member 60. The planet gears 20D are each configured to intermesh with both the sun gear member 20A and the ring gear member 20C.

The transmission 10 also includes torque-transmitting mechanisms or clutches 26, 28, 30 and brakes 32, 34, 36 and 38 that allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The third clutch 30 is selectively engageable to connect the output shaft or member 22 with the sixth shaft or interconnecting member 54. The first brake 32 is selectively engageable to connect the sixth shaft or interconnecting member 60 with the stationary element or a transmission housing 50 in order to restrict the member 60 from rotating relative to the transmission housing 50. The second brake 34 is selectively engageable to connect the eight shaft or interconnecting member 56 with the stationary element or the transmission housing 50 in order to restrict the member 60 from rotating relative to the transmission housing 50. The third brake 36 is selectively engageable to connect the ninth shaft or interconnecting member 58 with the stationary element or the transmission housing 50 in order to restrict the member 58 from rotating relative to the transmission housing 50. The fourth brake 38 is selectively engageable to connect the first shaft or interconnecting member 42 with the stationary element or the transmission housing 50 in order to restrict the member 42 from rotating relative to the transmission housing 50.

It will be appreciated that transmission 10 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36 and fourth brake 36). The torque transmitting devices 26, 28, 30, 32, 34, 36, and 38 can be any suitable type of device. For example, they can be friction clutches, clutch bands, dog clutches, or synchronizer mechanisms. The seven torque transmitting devices 26, 28, 30, 32, 34, 36, and 38 can be arranged in any suitable manner to minimize internal package complications. Further, the torque transmitting device 30 can be a bearing type of applied clutch.

Figure 2:
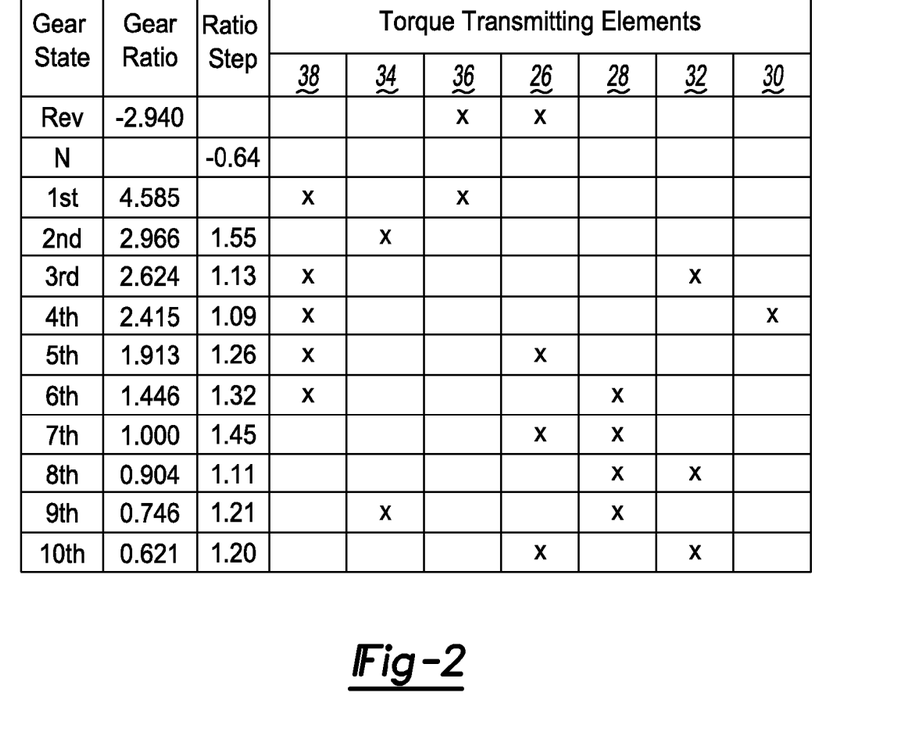
FIG. 2 is a truth table presenting the state of engagement of the various torque transmitting elements in each of the available forward and reverse speeds or gear ratios of the transmission illustrated in FIG. 1.

FIG. 2 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Returning to FIG. 1, in accordance with the principles of the present invention, the input shaft or member 12 is continuously connected to a torque convertor such as the starting device 70, and the output shaft or member 22 is continuously connected to an output transfer mechanism 90. The starting device 70 includes a torus 72 contained within a housing 71 coupled to the transmission housing 50. The torus 72 is connected to a stator through a one-way clutch 74 that insures that the torus rotates in only one direction. The torus 72 is also connected to the motor vehicle engine by a shaft or member 78. The starting device 70 further includes a dual spring/damper assembly 82 with two spring/dampers 80 and 84. The spring/damper assembly 82 is selectively coupled to the torus 72 with a clutch 76 to minimize vibrations transmission to the transmission 10. Further, torque from the engine is transmitted to the transmission 10 when the clutch 76 is engaged. In other implementations, the starting device 70 can include a fluid clutch that is subjected to a slip effect and optionally provided with a lockup clutch, a wet or dry type friction clutch, or a P2 electric motor device.

The transfer mechanism 90 is coupled to the output shaft or member 22 with a pair of sprockets 92 and 94 connected together with a chain 96. The transfer mechanism 90 includes a planetary gear set with a sun gear member 98A, a ring gear member 98C and a planet gear carrier member 98B that rotatably supports a set of planet gears 98D. The sun gear member 98A is connected for common rotation with a shaft or interconnecting member 100. The ring gear member 98C is connected transmission housing 50. The planet carrier member 98B is connected for common rotation with an open differential such as a pinion/gear assembly 102. The planet gears 98D are each configured to intermesh with both the sun gear member 98A and the ring gear member 98C.

The pinion/gear assembly 102 includes a pin 114 that engages with a set of pinion gears 122 such that torque from the transmission 10 is transmitted through the pinion/gear assembly to a set of axles 106 and 108 that drive the front wheels of the motor vehicle. The transfer mechanism 90 further includes a pair of mechanisms 110 and 112 that engage with respective splines such that the transmission 10 is suitable for use in an all-wheel drive mode.

Figure 3:
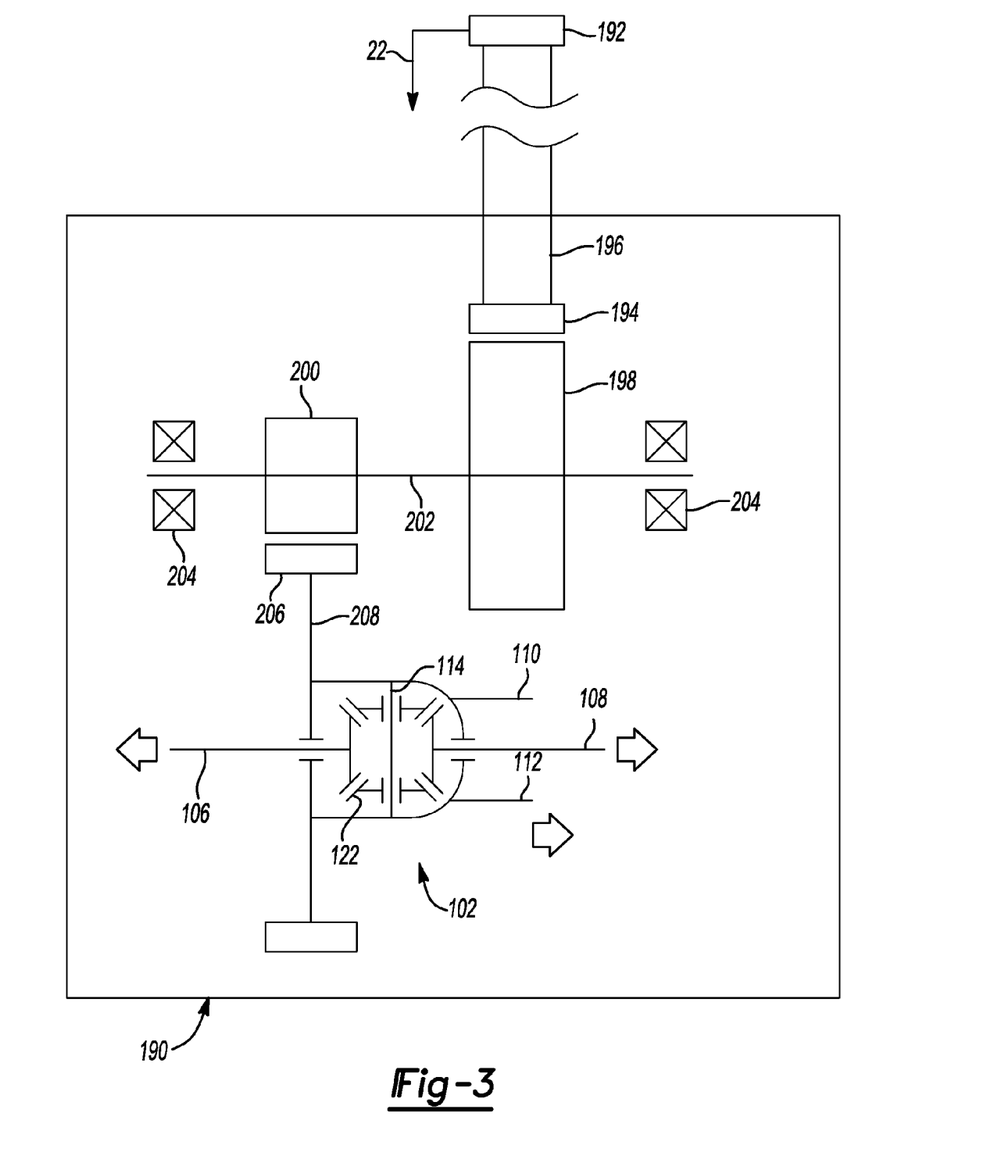
FIG. 3 illustrates an alternative transfer mechanism for the transmission shown in FIG. 1 in accordance with the principles of the present invention.

In another arrangement, the two-axis chain mechanism 90 is replaced by a three-axis gear transfer mechanism 190 shown in FIG. 3. The transfer mechanism 190 includes a set of gears 192, 194, and 196 that are coupled to a large ring gear 198. The large ring gear 198 is attached to a shaft 202 supported by a set of bearings 204. A smaller ring gear 200 is also attached to the shaft 202 such that there is a multiplier effect between the large ring gear 198 and the small ring gear 200. Torque is transmitted from the gear 200 to another gear 206 which in turn rotates a shaft or member 208. The shaft or member 208 is connected to the pinion/gear assembly 102. The components and operation of the pinion/gear assembly 102 is the same as that described above with reference to the two-axis-chain transfer mechanism.

Figure 4:
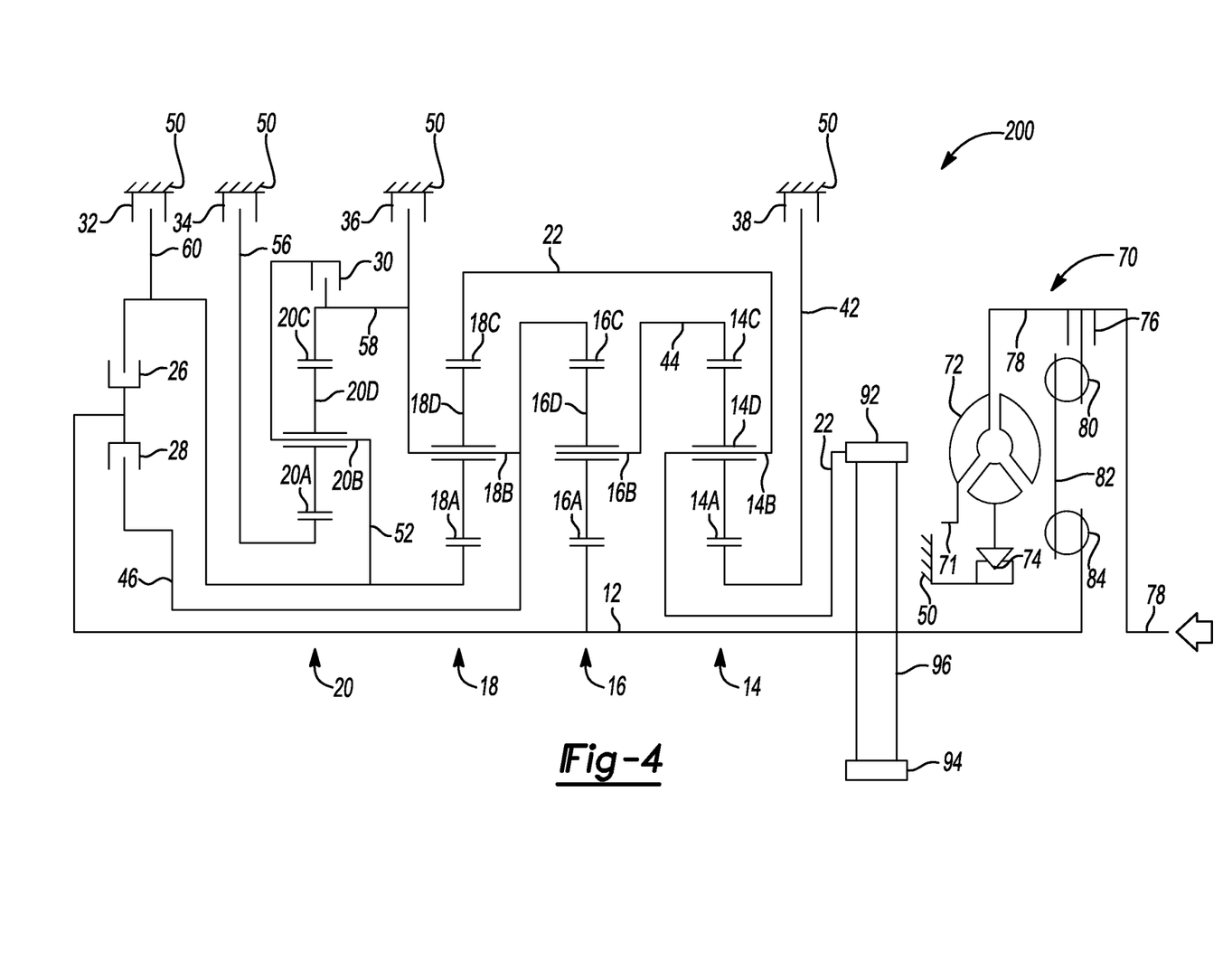
FIG. 4 is a diagrammatic illustration of a transmission with another embodiment of a gear and clutch arrangement in accordance with the principles of the present invention.

Turning now to FIG. 4, another embodiment of a transmission is generally indicated by reference number 200. The transmission 200 is similar to the transmission 10 described in FIGS. 1 and 2 and like components are indicated by like reference numbers. However, the transmission 200 has an alternate arrangement of the third clutch 30. For example, the third clutch 30 in transmission 200 selectively connects the third node or ring gear 20C of the fourth planetary gear set 20, the second node or carrier member 18B of the third planetary gear set 18, and the third node or ring gear 16C of the second planetary gear set 16 with the second node or carrier member 20B of the fourth planetary gear set 20 and the first node or sun gear 18A of the third planetary gear set 18. To accommodate this new configuration, the axial locations of the third clutch 30 and the third brake 36 are switched such that the third brake 36 is disposed axially forward (i.e. closest to the starting device 70) of the third clutch 30. It should be appreciated that the transmission 200 may include either the two-axis chain mechanism 90 shown in FIG. 1 or the three-axis gear transfer mechanism 190 shown in FIG. 3. It will be appreciated that transmission 200 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36 and fourth brake 36). The truth table shown in FIG. 2 presents the various combinations of torque-transmitting mechanisms that are activated or engaged to achieve the various gear states for the transmission 200.

Figure 5:
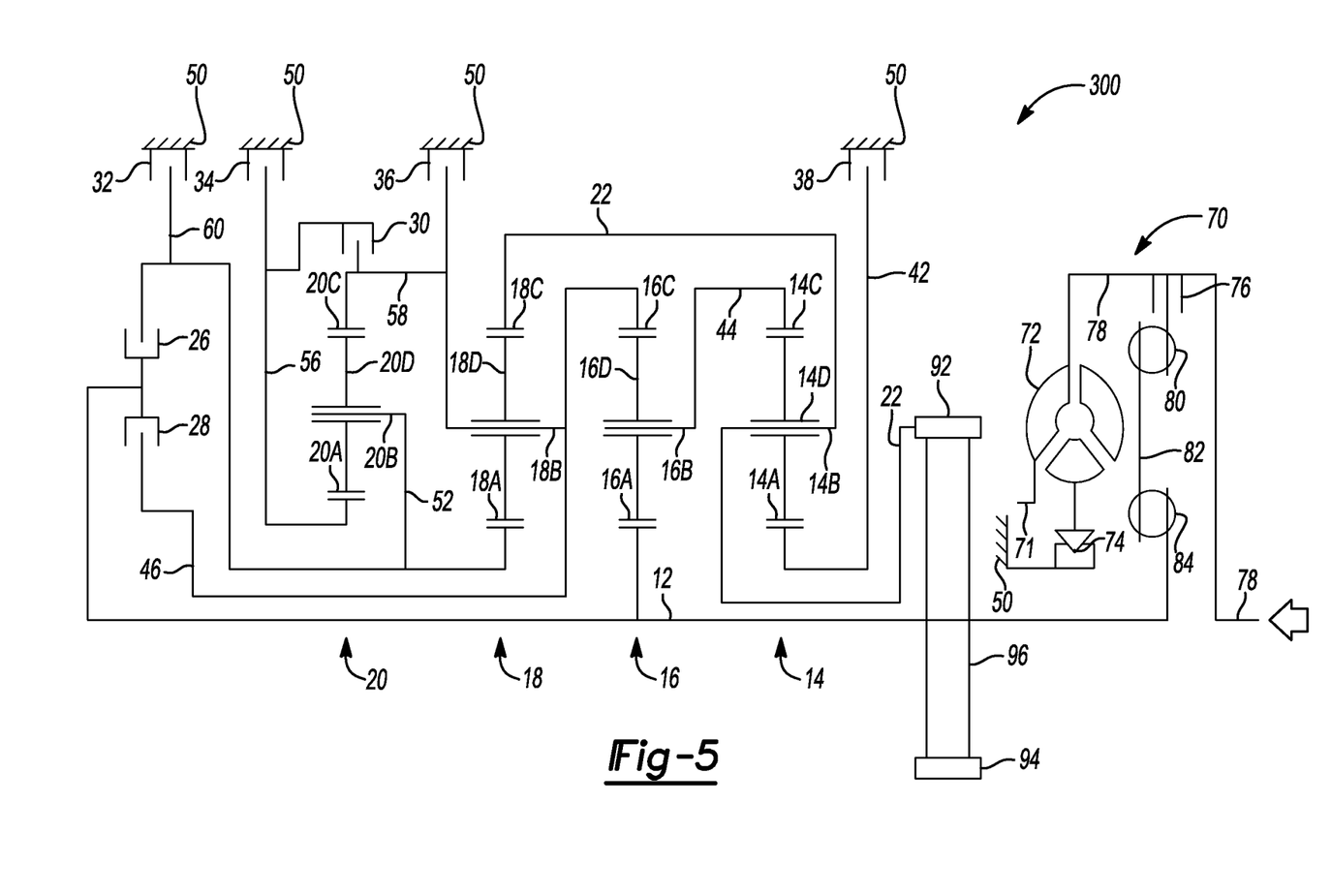
FIG. 5 is a diagrammatic illustration of a transmission with yet another embodiment of a gear and clutch arrangement in accordance with the principles of the present invention.

Referring to FIG. 5, another embodiment of a transmission is generally indicated by reference number 300. The transmission 300 is similar to the transmission 10 described in FIGS. 1 and 2 and like components are indicated by like reference numbers. However, the transmission 300 has an alternate arrangement of the third clutch 30. For example, the third clutch 30 in transmission 300 selectively connects the third node or ring gear 20C of the fourth planetary gear set 20, the second node or carrier member 18B of the third planetary gear set 18, and the third node or ring gear 16C of the second planetary gear set 16 with the first node or sun gear 20A of the fourth planetary gear set 20. To accommodate this new configuration, the axial locations of the third clutch 30 and the third brake 36 are switched such that the third brake 36 is disposed axially forward (i.e. closest to the starting device 70) of the third clutch 30. It should be appreciated that the transmission 300 may include either the two-axis chain mechanism 90 shown in FIG. 1 or the three-axis gear transfer mechanism 190 shown in FIG. 3. It will be appreciated that transmission 300 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36 and fourth brake 36). The truth table shown in FIG. 2 presents the various combinations of torque-transmitting mechanisms that are activated or engaged to achieve the various gear states for the transmission 300.

Figure 6:
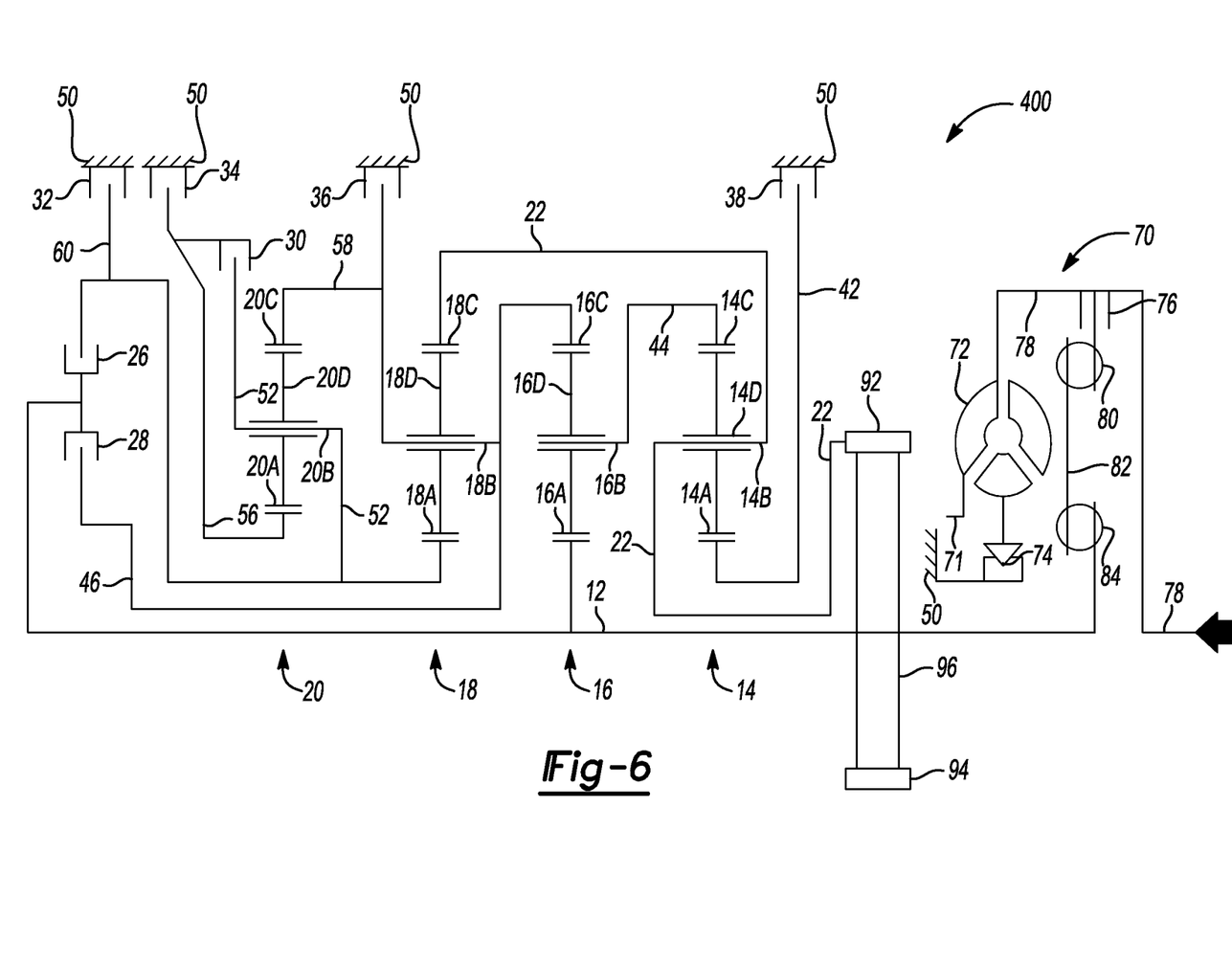
FIG. 6 is a diagrammatic illustration of a transmission with still another embodiment of a gear and clutch arrangement in accordance with the principles of the present invention.

Referring to FIG. 6, another embodiment of a transmission is generally indicated by reference number 400. The transmission 400 is similar to the transmission 10 described in FIGS. 1 and 2 and like components are indicated by like reference numbers. However, the transmission 400 has an alternate arrangement of the third clutch 30. For example, the third clutch 30 in transmission 400 selectively connects the second node or carrier member 20B of the fourth planetary gear set 20 and the first node or sun gear 18A of the third planetary gear set 18 with the first node or sun gear 20A of the fourth planetary gear set 20. To accommodate this new configuration, the axial locations of the third clutch 30 and the third brake 36 are switched such that the third brake 36 is disposed axially forward (i.e. closest to the starting device 70) of the third clutch 30. It should be appreciated that the transmission 400 may include either the two-axis chain mechanism 90 shown in FIG. 1 or the three-axis gear transfer mechanism 190 shown in FIG. 3. It will be appreciated that transmission 400 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36 and fourth brake 36). The truth table shown in FIG. 2 presents the various combinations of torque-transmitting mechanisms that are activated or engaged to achieve the various gear states for the transmission 400.

The description of the invention is merely exemplary in nature and variations that do not depart from the gist of the invention are intended to be within the scope of the invention. Such variations are not to be regarded as a departure from the spirit and scope of the invention.

What is claimed is:

1. A powertrain in a motor vehicle comprising:
   an input member;
   an output member;
   a transfer mechanism coupled to the output member;
   first, second, third and fourth planetary gear sets each having first, second and third members;
   a first interconnecting member continuously interconnecting the second member of the first planetary gear set with the third member of the third planetary gear set;
   a second interconnecting member continuously interconnecting the third member of the first planetary gear set with the second member of the second planetary gear set;
   a third interconnecting member continuously interconnecting the third member of the second planetary gear set with the second member of the third planetary gear set;
   a fourth interconnecting member continuously interconnecting the second member of the third planetary gear set with the third member of the fourth planetary gear set;
   a fifth interconnecting member continuously interconnecting the first member of the third planetary gear set with the second member of the fourth planetary gear set; and
   seven torque transmitting mechanisms each selectively engageable to interconnect at least one of the first, second, and third members with at least one other of the first, second, third members and a stationary member, and
   wherein the seven torque transmitting mechanisms are selectively engageable in combinations of at least two to establish at least ten forward speed ratios and at least one reverse speed ratio between the input member and the output member.

2. The powertrain of claim 1 wherein a first of the seven torque transmitting mechanisms is selectively engageable to interconnect the first member of the third planetary gear set and the second member of the fourth planetary gear set with the input member and the first member of the second planetary gear set.

3. The powertrain of claim 2 wherein a second of the seven torque transmitting mechanisms is selectively engageable to interconnect the third member of the second planetary gear set, the second member of the third planetary gear set and the third member of the fourth planetary gear set with the input member and the first member of the second planetary gear set.

4. The powertrain of claim 3 wherein a fourth of the seven torque transmitting mechanisms is selectively engageable to interconnect the first member of the fourth planetary gear set with the stationary member.

5. The powertrain of claim 4 wherein a fifth of the seven torque transmitting mechanisms is selectively engageable to interconnect the second member of the fourth planetary gear set and the first member of the third planetary gear set with the stationary member.

6. The powertrain of claim 5 wherein a sixth of the seven torque transmitting mechanisms is selectively engageable to interconnect the third member of the fourth planetary gear set, second member of the third planetary gear set and the third member of the second planetary gear set with the stationary member.

7. The powertrain of claim 6 wherein a seventh of the seven torque transmitting mechanisms is selectively engageable to interconnect the first member of the first planetary gear set with the stationary member.

8. The powertrain of claim 7 wherein a third of the seven torque transmitting mechanisms is selectively engageable to interconnect the first member of the third planetary gear set and the second member of the fourth planetary gear set with the third member of the fourth planetary gear set, the second member of the third planetary gear set, and the third member of the second planetary gear set.

9. The powertrain of claim 7 wherein a third of the seven torque transmitting mechanisms is selectively engageable to interconnect the first member of the fourth planetary gear set with the third member of the fourth planetary gear set, the second member of the third planetary gear set, and the third member of the second planetary gear set.

10. The powertrain of claim 7 wherein a third of the seven torque transmitting mechanisms is selectively engageable to interconnect the first member of the of the fourth planetary gear set with the second member of the fourth planetary gear set and the first member of the third planetary gear set.

11. The powertrain of claim 1 wherein the input member is continuously connected for common rotation with the first member of the second planetary gear set.

12. The powertrain of claim 1 wherein the output member is continuously connected for common rotation with the second member of the first planetary gear set and the third member of the third planetary gear set.

13. The powertrain of claim 1 wherein the first member of the first planetary gear set, the first member of the second planetary gear set, the first member of the third planetary gear set and the first member of the fourth planetary gear set are each sun gears, the second member of the first planetary gear set, the second member of the second planetary gear set, the second member of the third planetary gear set, and the second member of the fourth planetary gear set are each carrier members and the third member of the first planetary gear set, the third member of the second planetary gear set, the third member of the third planetary gear set and the third member of the fourth planetary gear set are each ring gears.

14. The powertrain of claim 1 wherein an output torque is transmitted to the transfer mechanism through the output member, wherein the transfer mechanism includes a differential assembly that provides front-wheel drive and all-wheel drive modes to the motor vehicle.

15. The powertrain of claim 1 wherein the transfer mechanism comprises:
   a transfer gear train having a first transfer gear intermeshed with a second transfer gear, wherein the first transfer gear is rotatably fixed to the output member and the second transfer gear is rotatably fixed to an intermediate shaft;
   a differential gear set for driving a pair of road wheels;
   a pinion gear rotatably fixed to the intermediate shaft; and
   an input differential gear in mesh with the pinion gear and configured to rotatably drive the differential gear set.

16. The powertrain of claim 1 wherein the transfer mechanism comprises:
   a power transfer assembly having a first transfer gear and a second transfer gear, wherein the first transfer gear is rotatably fixed to the output member and the second transfer gear is rotatably fixed to a drive shaft;
   a power transfer member rotatably coupling the first and second transfer gears for transferring rotational energy from the first transfer gear to the second transfer gear;
   a final drive planetary gear set coupled to the drive shaft for receiving a driving torque from the second transfer gear; and
   a differential gear set coupled to the final drive planetary gear set and to a pair of road wheels for receiving a final drive rotational torque and transferring the final drive torque to the pair of road wheels.

17. The powertrain of claim 16 wherein the power transfer member is a chain or belt.

18. The powertrain of claim 17 wherein the final drive planetary gear set includes a sun gear, a ring gear, and a carrier member, and wherein the sun gear is connected to the drive shaft, the ring gear is connected to the stationary member, and the carrier member is coupled to the differential gear set.

19. The powertrain of claim 1 further comprising a torque converter coupled to the input member, the torque converter providing an input torque to the input member.

20. A transmission comprising:
   an input member;
   an output member;
   first, second, third and fourth planetary gear sets each having a sun gear, a carrier member and a ring gear, wherein the input member is continuously connected for common rotation with the sun gear of the second planetary gear set, and wherein the output member is continuously connected for common rotation with the carrier member of the first planetary gear set;
   a first interconnecting member continuously interconnecting the carrier member of the first planetary gear set with the ring gear of the third planetary gear set;
   a second interconnecting member continuously interconnecting the ring gear of the first planetary gear set with the carrier member of the second planetary gear set;
   a third interconnecting member continuously interconnecting the ring gear of the second planetary gear set with the carrier member of the third planetary gear set;
   a fourth interconnecting member continuously interconnecting the carrier member of the third planetary gear set with the ring gear of the fourth planetary gear set;
   a fifth interconnecting member continuously interconnecting the sun gear of the third planetary gear set with the carrier member of the fourth planetary gear set;
   a first torque transmitting mechanism selectively engageable to interconnect the sun gear of the third planetary gear set and the carrier member of the fourth planetary gear set with the input member and the sun gear of the second planetary gear set;
   a second torque transmitting mechanism selectively engageable to interconnect the ring gear of the second planetary gear set, the carrier member of the third planetary gear set and the ring gear of the fourth planetary gear set with the input member and the sun gear of the second planetary gear set;
   a third torque transmitting mechanism selectively engageable to interconnect the sun gear of the fourth planetary gear set with the ring gear of the fourth planetary gear set, the carrier member of the third planetary gear set, and the ring gear of the second planetary gear set;
   a fourth torque transmitting mechanism selectively engageable to interconnect the sun gear of the fourth planetary gear set with the stationary member;
   a fifth torque transmitting mechanism selectively engageable to interconnect the carrier member of the fourth planetary gear set and the sun gear of the third planetary gear set with the stationary member;
   a sixth torque transmitting mechanism selectively engageable to interconnect the ring gear of the fourth planetary gear set, carrier member of the third planetary gear set and the ring gear of the second planetary gear set with the stationary member; and
   a seventh torque transmitting mechanisms selectively engageable to interconnect the sun gear of the first planetary gear set with the stationary member, and
   wherein the torque transmitting mechanisms are selectively engageable in combinations of at least two to establish a plurality of forward speed ratios and at least one reverse speed ratio between the input member and the output member.

* * * * *